United States Patent [19]

Gruffaz et al.

[11] 3,978,152
[45] Aug. 31, 1976

[54] HEAT-RESISTANT RESINS DERIVED FROM A BIS-IMIDE, AN EPOXY RESIN AND A POLYAMINE

[75] Inventors: Max Gruffaz, La Mulatiere; Gerard Lefebvre, Lyon, both of France

[73] Assignee: Rhone-Poulenc Industries, Paris, France

[22] Filed: Jan. 31, 1975

[21] Appl. No.: 545,968

[30] Foreign Application Priority Data

Feb. 4, 1974 France .............................. 74.03614

[52] U.S. Cl. ...................... 260/830 P; 260/29.2 EP; 260/47 EN; 260/49; 260/59 EP; 260/78 UA; 260/78 SC; 526/11.2
[51] Int. Cl.² .................. C08G 45/06; G08G 45/12
[58] Field of Search ................. 260/47 EN, 2 N, 59, 260/78 UA, 830 P

[56] References Cited
UNITED STATES PATENTS

| | | | |
|---|---|---|---|
| 2,909,448 | 10/1959 | Schroeder et al. | 260/2 N X |
| 3,637,901 | 1/1972 | Bargain et al. | 260/830 P |
| 3,763,087 | 10/1973 | Holub | 260/837 X |
| 3,875,113 | 4/1975 | Lefebvre | 260/247 EN |

FOREIGN PATENTS OR APPLICATIONS

2,159,311  11/1971  Germany

*Primary Examiner*—Murray Tillman
*Assistant Examiner*—T. Pertilla
*Attorney, Agent, or Firm*—Stevens, Davis, Miller & Mosher

[57] ABSTRACT

Polymers possessing imide groups are disclosed. These polymers display good impact strength and are obtained by reacting:

a. a bis-imide of the formula

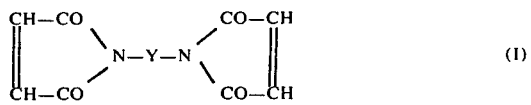

(I)

in which Y represents a divalent hydrocarbon radical with 2 to 20 carbon atoms which is free from unsaturated bonds other than aromatic bonds, a divalent mono- or bis-heterocyclic radical with 2 to 10 carbon atoms, or a divalent organic radical with 4 to 20 carbon atoms consisting of several of the hydrocarbon radicals defined above connected to one another by —O—, —S—, —CO— or —SO$_2$—, and b. either an adduct (A) obtained by reacting an epoxy resin and a polyamine of the general formula:

$$Z(-NH_2)_v \qquad (II)$$

in which Z represents an organic radical of valency $v$ and $v$ represents an integer at least equal to 2, or a mixture comprising the adduct (A) and an amine of the formula:

$$X(NH_2)_m \qquad (III)$$

in which X represents an organic radical of valency $m$ and $m$ represents an integer at least equal to 1, the proportions of the reagents being such that if $n_1$ denotes the number of —NH$_2$ groups of the polyamine of formula (II) and $n_2$ denotes the number of epoxy groups of the epoxy resin, $n_3$ denotes the number of carbon-carbon double bonds in the bis-imide of formula (I) and $n_4$ denotes the total number of —NH$_2$ groups in component b), the ratio $n_1/n_2$ is greater than 1 and the ratio $n_3/n_4$ is between 1 and 10. The polymers are particularly useful in the preparation of moulded and laminated articles.

12 Claims, No Drawings

HEAT-RESISTANT RESINS DERIVED FROM A BIS-IMIDE, AN EPOXY RESIN AND A POLYAMINE

The present invention relates to new polymers containing imide groups.

It is known (see French Patent No. 1,555,564) that it is possible to prepare heat-resistant polymers by reacting an N,N'-bis-imide of an unsaturated dicarboxylic acid with a diprimary diamine of the formula

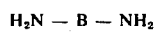

in which the symbol B represents a divalent organic radical containing up to 30 carbon atoms. These polymers, which possess noteworthy heat-resistance, can be used to manufacture moulded articles or laminates for a variety of purposes.

It has now been found, according to the present invention, that it is possible to prepare polymers which possess, among other properties, a high impact strength, by reacting a bisimide with an adduct possessing an amino group formed from an epoxy resin and excess diamine.

According to the present invention there is provided a polymer possessing imide groups, which is prepared by reacting:

a. a bis-imide of the formula

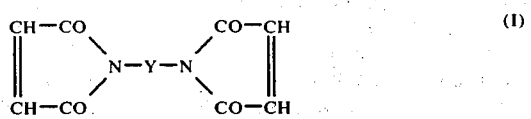

in which the symbol Y represents a hydrocarbon radical with 2 to 20 carbon atoms which is free from unsaturated bonds other than aromatic bonds, a mono- or bis-heterocyclic radical with 2 to 10 carbon atoms or an organic radical with 4 to 20 carbon atoms consisting of several of the hydrocarbon radicals defined above, connected to one another by —O—, —S—, —CO— or —SO$_2$—, with b. an amine-type compound consisting of either an adduct (A) formed from an epoxy resin and a polyamine of the general formula

in which the symbol Z represents an organic radical of valency $v$ and $v$ represents an integer at least equal to 2, or a mixture comprising the adduct (A) and an amine of the formula

in which the symbol X represents an organic radical of valency $m$ and $m$ represents an integer at least equal to 1, the proportions of the reagents being such that if, on the one hand, with regard to the adduct (A) $n_1$ denotes the number of —NH$_2$ groups of the polyamine of formula (II), and $n_2$ denotes the number of epoxy groups of the epoxy resin, and, on the other hand, $n_3$ denotes the number of carbon-carbon double bonds of the bisimide of formula (I), and $n_4$ denotes the total number of —NH$_2$ groups of the amine-type compound (b), the ratio $n_1/n_2$ is greater than 1 and the ratio $n_3/n_4$ is between 1 and 10.

The divalent hydrocarbon radicals which the symbols X, Y and Z in the formulae (I), (II) and (III) can represent can be, for example, a linear or branched alkylene radical with 2 to 12 carbon atoms, a phenylene radical, a cyclohexylene radical, a naphthylene radical, a biphenylene radical, a xylylene radical or a radical of the formula,

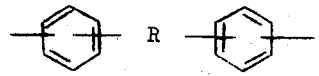

in which the symbol R denotes an alkylene radical with 1 to 3 carbon atoms, optionally substituted by a phenyl radical. The phenylene radicals can be substituted by groups such as CH$_3$ or OCH$_3$, or by a chlorine atom. When the symbols X, Y or Z represent a heterocyclic radical, they can be, for example, radicals of the formula:

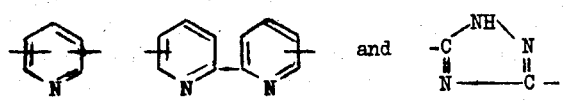

The symbols X and Z can also represent a radical which contains up to, for example, 50 carbon atoms and posesses 3 to 5 free valencies, such as a radical of a naphthalene, pyridine or triazine nucleus, a benzene nucleus which can be substituted by one to three methyl groups, or several benzene nuclei bonded to one another by an inert atom or group which can be one of those indicated above or

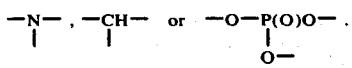

Again, the symbol X can represent a linear or branched alkyl or alkenyl radical which can contain up to, for example, 18 carbon atoms, a cycloalkyl radical containing 5 or 6 carbon atoms in the ring, a mono- or bi-cyclic aryl, akylaryl or aralkyl radical containing up to 18 carbon atoms, one of the radicals

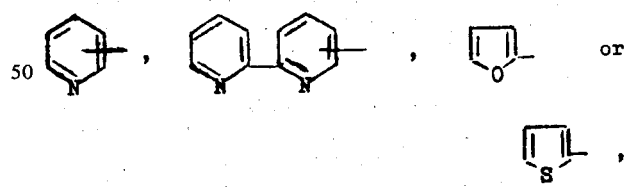

a monovalent radical consisting of a phenyl radical and a phenylene radical bonded to one another by a single valency bond or by an inert atom or group such as —O—, —S—, an alkylene radical with 1 to 3 carbon atoms, —CO—, —SO$_2$—, —NR$_1$—, —N=N—, —CONH— or —COO—, wherein R$_1$ represents an alkyl radical with 1 to 4 carbon atoms.

Specific examples of bis-imides of formula (I) include: N,N'-ethylene-bis-maleimide, N,N'-hexamethylene-bis-maleimide, N,N'-dodecamethylene-bis-maleimide, N,N'-(2,2,4-trimethyl-hexamethylene)-bis-maleimide, 1,2-bis-(2-maleimido-ethoxy)-ethane, 1,3-bis-(3-maleimide-propoxy)-propane, N,N'-meta-phenylene-bis-maleimide, N,N'-para-phenylene-bis-maleimide, N,N'-4,4'-diphenylmethane-bis-maleimide, N,N'-4,4'-(diphenyl ether)-bis-maleimide, N,N'-4,4'-(diphenyl sulphide)-bis-maleimide, N,N'-4,4'-diphenylsulphone-bis-maleimide, N,N'-4,4'-benzophenone-bis-maleimide, N,N'-4,4'-dicyclohexylmethane-bis-maleimide, N,N'-pyridine-2,6-diyl-bis-maleimide, N,N'-α,α'-4,4'-dimethylenecyclohexane-bis-maleimide, N,N'-meta-xylylene-bis-maleimide, N,N'-para-xylylene-bis-maleimide, N,N'-4,4'-(1,1-diphenyl-propane)-bis-maleimide, N,N'-4,4'-(1,1,1-triphenyl-ethane)-bis-maleimide, N,N'-4,4'-triphenylmethane-bis-maleimide, N,N'-3,5-(1,2,4-triazole)-bis-maleimide, N,N'-1,5-naphthylene-bis-maleimide, N,N'-1,4-cyclohexylene-bis-maleimide, N,N'-5-methyl-1,3-phenylene-bis-maleimide and N,N'-5-methoxy-1,3-phenylene-bis-maleimide. These bis-maleimides can be prepared by applying the methods described in, for example, U.S. Pat. No. 3,018,290, British Patent Specification No. 1,137,592 or French Patent No. 2,055,969.

It is possible to use a relatively pure bis-maleimide of formula (I) but it is also possible to use crude mixtures originating from, for example, the dehydration of bis-maleamic acids by means of acetic anhydride and triethylamine in the presence of a nickel catalyst. When dealing, in particular with N,N'-4,4'-diphenylmethane-bis-maleimide, which is a preferred bis-imide for use in the present invention, it is known (see DOS No. 2,159,311) that during the dehydration of the corresponding bis-maleamic acid under the conditions mentioned above, it is possible to obtain crude mixtures containing at least 85% of bis-maleimide, the remainder consisting essentially of 4-maleimido-4'-acetamido-diphenylmethane and 4-maleimido-4'-acetoxysuccinimidodiphenylmethane. Such crude products can advantageously be used in the invention.

The expression "epoxy resin" is used herein with its usual meaning, that is to say it denotes a compound containing more than one

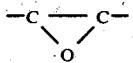

group, it being possible for the compound to be cured irreversibly to form a solid material which is insoluble in the usual solvents and which does not have a melting point or a softening point over a very wide temperature range.

All the usual epoxy resins can be employed in the process of the present invention. Amongst these resins, there may be mentioned especially glycidyl ethers prepared by reacting polyols, such as glycerol, trimethylolpropane, butanediol or pentaerythritol, with epichlorohydrin, in a known manner. Other suitable epoxy resins are glycidyl ethers of phenols such as 2,2-bis-(4-hydroxy-phenyl)-propane, bis-(hydroxy-phenyl)methane, resorcinol, hydroquinone, pyrocatechol, phloroglucinol, 4,4'-dihydroxy-diphenyl and condensation products of the phenol/aldehyde type. It is also possible to use the products resulting from the reaction of epichlorohydrin with primary or seconary amines such as bis-(4-methylamino-phenyl)-methane or bis-(4-amino-phenyl)-sulphone, as well as aliphatic or alicyclic poly-epoxides obtained by the epoxidation, by means of per-acids, of the corresponding unsaturated derivatives. These various types of epoxy resins are now well described in the literature and, as far as their preparation is concerned, reference can, for example, be made to the work of Houben-Weil, volume 14/2, page 462. The epoxy equivalent weight, which represents the weight of resin (in grams) containing one gram equivalent of epoxy group, can vary within very wide limits. Resins which have an epoxy equivalent weight of from 100 to 1,000 are generally chosen. As regards the physical characteristics of the resin, they can be liquid resins of low viscosity (for example 2 cPo at 25°C) or solid resins having a melting point as high as, for example, 150°C. Essentially aromatic resins such as the glycidyl ethers of poly-(hydroxyphenyl)-alkanes or phenol/formaldehyde resins as well as resins of the cycloaliphatic type such as those described in French Patent. No. 1,504,104 are preferably used.

Specific examples of polyamines of formula (II), which preferably contain at least 5 carbon atoms, include diamines such as 1,3-diamino-cyclohexane, 1,4-diamino-cyclohexane, 2,6-diamino-pyridine, meta-phenylene-diamine, para-phenylene-diamine, 4,4'-diamino-diphenylmethane, 2,2-bis-(4-amino-phenyl)-propane, benzidine, 4,4'-diamino-phenyl ether, 4,4'-diamino-phenyl sulphide, 4,4'-diamino-diphenylsulphone, 1,5-diamino-naphthalene, meta-xylylene-diamine, para-xylylene-diamine, hexamethylenediamine, 6,6'-diamino-2,2'-dipyridyl, 4,4'-diamino-benzophenone and bis-(4-amino-phenyl)-phenylmethane.

The polyamines of formula (II) which contain more than two -NH$_2$ groups can be, for example, 1,3,5-triamino-benzene, 2,4,6-triamino-toluene, 2,4,6-triamino-1,3,5-trimethyl-benzene, 1,3,7-triamino-naphthalene, 2,4,4'-triamino-diphenyl, 2,4,6-triamino-pyridine, 2,4,4'-triamino-phenyl ether, 2,4,4'-triaminodiphenylmethane, 2,4,4'-triamino-diphenylsulphone, 2,4,4'-triamino-benzophenone, 2,4,4'-triamino-3-methyl-diphenylmethane, N,N,N-tri-(4-amino-phenyl)-amine, tri-(4-amino-phenyl)-methane, and oligomers of the average formula:

in which R$_2$ represents a divalent hydrocarbon radical with 1 to 8 carbon atoms and $x$ represents a number ranging approximately from 0.1 to 2. These oligomers possessing amino groups can be prepared in accordance with known processes such as those which are described in French Patents Nos. 1,430,977, 1,481,935 and 1,533,696.

The amine-type compound b) can consist of the adduct (A) or of a mixture comprising this adduct (A) and an amine of formula (III).

The preparation of the adduct (A) is preferably carried out in the absence of solvent, at a temperature of, for example, 50° to 200°C, preferably 120° to 170°C. The amounts of epoxy resin and polyamine (II) are then such that the raio $n_1/n_2$ is at most equal to 2. The polyamine is usually pre-heated and the epoxidized compound is incorporated gradually into the polyamine. It is also possible to introduce the two reagents simultaneously into a reactor heated to a suitable temperature, as indicated above.

When the amine-type compound b) comprises the adduct (A) and an amine (III), it is possible, in the first place, to prepare this compound directly by reacting amounts of epoxy resin and polyamine (II) such that the ratio $n_1/n_2$ is greater than 2. In this case, the reaction medium comprises, in effect, both the adduct (A) and the excess polyamine (II).

It is also possible to add an amine (III) to the adduct (A) or to the mixture of adduct (A) and excess polyamine (II). The amine (III) can, if desired, be the same as that used for the preparation of the adduct (A). More generally, this amine (III) can be a compound containing 2 to 5 —NH$_2$ groups, such as those polyamines mentioned above as illustrating polyamines of formula (II).

The amine of formula (III) can also consist of or comprise a monoamine, such as: methylamine, ethylamine, isopropylamine, n-butylamine, tertiary butylamine, n-hexylamine, cyclopropylamine, cyclobutylamine, cyclohexylamine, 3-isopropylcyclopentylamine, benzylamine, aniline, 3,4-dimethyl-aniline, 2-amino-furane, 2-amino-thiophene, 2-amino-pyridine, 4-amino-pyridine and 4-amino-diphenyl.

On heating the mixture comprising the amine-type compound b) and the bis-imide (I) to a temperature of from 150° to 350°C, more generally from 170° to 300°C, polymers can be obtained which are insoluble in the usual solvents and which do not undergo substantial softening below the temperature at which they begin to undergo degradation.

According to a preferred procedure, especially because of the convenience with which it can be carried out, the polymers are prepared in two stages. In the first stage, a prepolymer (P) is prepared by heating the mixture of reagents at from 50° to 220°C until a liquid or paste-like mass is obtained. It is also possible to prepare a prepolymer (P) at 50° to 220°C in the presence of a solvent such as N-methyl-2-pyrrolidone, dimethylformamide, dimethylacetamide or dimethylsulphoxide. This prepolymer (P) is soluble in the abovementioned solvents and possesses a softening point which is generally from 50° to 200°C.

After the prepolymer has been shaped, where appropriate, it can be converted into an insoluble and infusible polymer, as indicated above, by heating, generally at a temperature of from 100° to 350°C, preferably from 170° to 300°C. During this heating process, the prepolymer can be subjected to a pressure which can be as high as 400 bars and is generally from 50 to 300 bars. After these operations, it is possible to stove the polymer, for example for 12 to 48 hours at a temperature of 200° to 300°C.

The polymers according to the invention can be used for a variety of purposes. They can thus be used for manufacturing moulded articles. In this application, they are generally used in conjunction with fibrous fillers such as glass fibres, carbon fibres, asbestos fibres and fibres of synthetic polymers, and especially heat-resistant polymers such as polyamide-imides or aromatic polyamides, or in conjunction with pulverulent fillers. Depending on the use envisaged, these fillers can be chosen so as to impart special properties to the moulded article, such as a self-lubricating character, for example by using graphite, molybdenum disulphide or particles of a fluorinated polymer, or abrasiveness, for example by using diamond powder or corundum.

The filled compositions, which can contain up to, for example, 60% by weight of fillers, can be prepared by simply mixing the fillers with the prepolymer or with the starting agents, the prepolymer being formed, in this case, in the presence of the fillers.

The prepolymers can also be used, in the form of aqueous dispersions or solutions, for impregnating woven or non-woven structures which are based on natural, artificial or synthetic fibres, it being possible thereafter to use the said impregnated structures to prepare laminates.

The moulded articles or laminated structures manufactured from the polymers according to the invention are characterized by possessing a high impact strength. This property, which is also called resilience, is particularly desirable both when machining the articles and when placing them in position. It is known, in fact, that when such articles are attacked by tools rotating at high speed (for example milling cutters, grinding wheels or saws), a violent shock is created which can lead to considerable damage. Likewise, the placing of these articles in position by applying force, under hot or cold conditions, under the effect of presses or jacks, creates mechanical stresses which can also cause damage. Such conditions exist, for example, when the articles are used as compressor segments or valve seats.

It must, of course, be understood that these applications are mentioned only by way of illustration and that the articles formed from the polymers according to the invention can, in conjunction with suitable fillers, be used in other applications, for example as brake or clutch linings and transmission bearings.

The following Examples further illustrate the present invention.

EXAMPLE 1 a. 260 g of bis-(4-amino-phenyl)-methane are introduced into a 1 liter reactor and heated to 140°C. 200 g of an epoxy resin of the average formula:

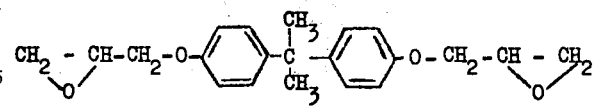

, the epoxy equivalent weight of which is approximately 181, are then added dropwise over the course of 50 minutes, this epoxy resin having been pre-heated to 80°C. Heating at 140°C is continued for 30 minutes and then the product obtained is ground. This adduct softens at 52°C and its melting point is 62°C. It contains 0.31 NH$_2$ group per 100 g and 0.235 NH group per 100 g.

b. 58.3 g of N,N'-4,4'-diphenylmethane-bis-maleimide are added to 41.7 g of the adduct prepared according to (a). The mixture is stirred and heated at 160°C for 10 minutes; the prepolymer obtained is cast in a parallelepiped-shaped mould (125 mm × 6 mm × 75 mm) heated to 200°C. The softening point of the prepolymer — after cooling and grinding — is 104°C.

The whole is kept at 200°C for 24 hours and then, after release from the mould, is stoved for 24 hours at 250°C. Test pieces are cut out and the following measurements are made thereon:

the flexural breaking strength and the modulus at 25°C: ASTM Standard Specification D 790-63, using a span of 25.4 mm, and the impact strength (resilience): Standard Specification DIN 51,230, unnotched test pieces.

The following results are obtained:
Flexural strength at 25°C: 15.5 kg/mm²
Flexural modulus: 217 kg/mm²
Resilience: 29 kg.cm/cm³

EXAMPLE 2

Example 1(b) is repeated, using:
73.7 g of the bis-maleimide and 26.3 g of a mixture consisting of 23 g of the adduct prepared according to Example 1(a) and 3.3 g of bis-(4-amino-phenyl)-methane.

The following results are obtained:
Flexural strength at 25°C: 14.1 kg/mm²
Flexural modulus: 196 kg/mm²
Resilience: 27 kg.cm/cm³

EXAMPLE 3

69 g of the bis-maleimide of Example 1, 23 g of the adduct prepared in Example 1 a) and 8 g of bis-(4-amino-phenyl)methane are mixed at 160°C and, after 10 minutes at 160°C, test pieces are moulded in accordance with the procedure described under Example 1(b).

The following results are obtained:
Flexural strength at 25°C: 17.7 kg/mm²
Flexural modulus: 211 kg/mm²
Resilience: 39 kg.cm/cm³

EXAMPLE 4 a. following the procedure of Example 1(a), an adduct is prepared from: 260 g of bis-(4-amino-phenyl)-methane, and 140 g of a novolac epoxy resin, the epoxy equivalent weight of which is approximately 178.

The adduct obtained softens at 51°C and its melting point is 60°C. It contains 0.46NH₂ group per 100 g and 0.19 NH group per 100 g.

b. Example 1(b) is repeated, using:
67.5 g of bis-maleimide and 32.5 g of the adduct prepared according to (a). The softening point of the prepolymer obtained is 73°C.

The following results are obtained:
Flexural strength at 25°C: 18.2 kg/mm², and at 200°C: 9.5 kg/mm²
Flexural modulus at 25°C: 211 kg/mm², and at 200°C: 159 kg/mm²
Resilience: 29 kg.cm/cm³

EXAMPLE 5 a. Following the procedure of Example 1(a), an adduct is prepared from: 65 g of bis-(4-amino-phenyl)-methane and 240 g of an epoxy resin derived from bis-phenol A, the epoxy equivalent weight of which is 1,650–2,050, and which is sold commercially under the name Epikote 1007.

The adduct obtained softens at 85°C and its melting point is 142°C. It contains 0.174 NH₂ group in 100 g and 0.036 NH group in 100 g.

b. 58.6 g of N,N'-4,4'-diphenylmethane-bis-maleimide, 10.1 g of the adduct prepared according to (a) and 11.3 g of bis-(4-amino-phenyl)-methane are mixed at 160°C.

After 12 minutes at 160°C, the mixture being clear and homogeneous, the prepolymer (softening point 67°C) is cast in a parallelpiped-shaped mould (125 mm × 75 mm × 6 mm) preheated to 200°C.

The whole is kept at 200°C for 24 hours and then, after release from the mould, the article is stoved at 250°C for 24 hours. The article obtained possesses a resilience of 33.5 kg.cm/cm³.

c. The procedure of b) is followed, using 51.7 g of N,N'-4,4'-diphenylmethane-bis-maleimide, 20.3 g of the adduct prepared according to a) and 8 g of bis-(4-aminophenyl)-methane.

A resilience of 38 kg.cm/cm³ is obtained.

We claim:

1. Process for preparing a polymer possessing imide groups, which comprises reacting at a temperature of at least 50°C.:

a. a bis-imide of the formula:

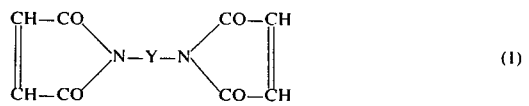

in which Y represents a divalent hydrocarbon radical with 2 to 20 carbon atoms which is free from unsaturated bonds other than aromatic bonds, a divalent mono- or bis-heterocyclic radical with 2 to 10 carbon atoms, or a divalent organic radical with 4 to 20 carbon atoms consisting of several of the hydrocarbon radicals defined above connected to one another by —O—, —S—, —CO— or —SO₂—, and b. either an adduct (A) obtained by reacting at a temperature from 50° to 200°C. a resin containing more than one 1,2-epoxy group and a polyamine of the general formula:

in which Z represents an organic radical of valency $v$ and $v$ represents an integer at least equal to 2, or a mixture comprising the adduct (A) and an amine of the formula:

in which X represents an organic radical of valency $m$ and $m$ represents an integer at least equal to 1, the proportions of the reagents being such that if on the one hand, with regard to the adduct (A) $n_1$ denotes the number of —NH₂ groups of the polyamine of formula (II) and $n_2$ denotes the number of epoxy groups of the epoxy resin, and, on the other hand $n_3$ denotes the number of carbon-carbon double bonds in the bis-imide of formula (I) and $n_4$ denotes the total number of —NH₂ groups in component (b) the ratio $n_1/n_2$ is greater than 1 and the ratio $n_3/n_4$ is between 1 and 10.

2. Process according to claim 1 for preparing a polymer possessing a softening point of 50° to 200°C which comprises heating the bis-imide and component (b) at a temperature of from 50° to 220°C until a liquid or paste-like mass is obtained.

3. Process according to claim 1 for preparing a polymer possessing a softening point of 50° to 200°C which comprises heating the bis-imide and component (b) at from 50° to 220°C in the presence of a solvent.

4. Process according to claim 1 for preparing a polymer which is substantially insoluble in conventional solvents and does not undergo significant softening below the temperature at which it begins to degrade which comprises heating a mixture comprising the bisimide and component (b) at a temperature of from 150° to 350°C.

5. Process according to claim 1 in which the adduct (A) is derived from an aromatic or cycloaliphatic epoxy resin and from a polyamine containing at least 5 carbon atoms.

6. Process according to claim 5 in which the epoxy resin is a novolac epoxy resin or an epoxy resin derived from bisphenol A.

7. Process according to claim 1 in which the bisimide is used as a reaction mixture from the dehydration of a bis maleamic acid with acetic anhydride and triethylamine in the presence of a nickel catalyst.

8. Process according to claim 1 in which the bisimide is N,N'-4,4'-diphenylmethane-bis-maleimide.

9. A polymer possessing a softening point of 50° to 200°C prepared by a process as defined in claim 2.

10. A polymer possessing a softening point of 50° to 200°C prepared by a process as defined in claim 3.

11. A polymer which is substantially insoluble in conventional solvents and does not undergo significant softening below the temperature at which it begins to degrade prepared by a process as defined in claim 4.

12. Process for preparing a polymer which is substantially insoluble in conventional solvents and does not undergo significant softening below the temperature at which it begins to degrade which comprises heating a polymer as claimed in claim 9 at 150° to 350°C.

* * * * *